United States Patent [19]

Harada et al.

[11] 4,443,084

[45] Apr. 17, 1984

[54] FILM WINDING DEVICE

[75] Inventors: Toshimitsu Harada; Koji Watanabe, both of Hachioji, Japan

[73] Assignee: Konishiroku Photo Industry Co., Ltd., Tokyo, Japan

[21] Appl. No.: 311,659

[22] Filed: Oct. 15, 1981

[30] Foreign Application Priority Data

Oct. 31, 1980 [JP] Japan ............................ 55-152155

[51] Int. Cl.³ .............................................. G03B 1/12
[52] U.S. Cl. ............................................. 354/173.11
[58] Field of Search ............................................. 354/173

[56] References Cited

U.S. PATENT DOCUMENTS 4,339,187  7/1982  Matsuura et al. .................. 354/173

*Primary Examiner*—Michael L. Gellner
*Attorney, Agent, or Firm*—Jordan B. Bierman; Linda Bierman; C. Cornell Remsen, Jr.

[57] ABSTRACT

The invention is directed to an arrangement controlling the film winding mechanism of a camera. In particular, the take-up amount of the film is monitored, and if the take-up amount of the film does not fall within the prescribed amount of film within a prescribed period of time, this is detected and a control circuit is actuated to stop the film-winding operation.

4 Claims, 3 Drawing Figures

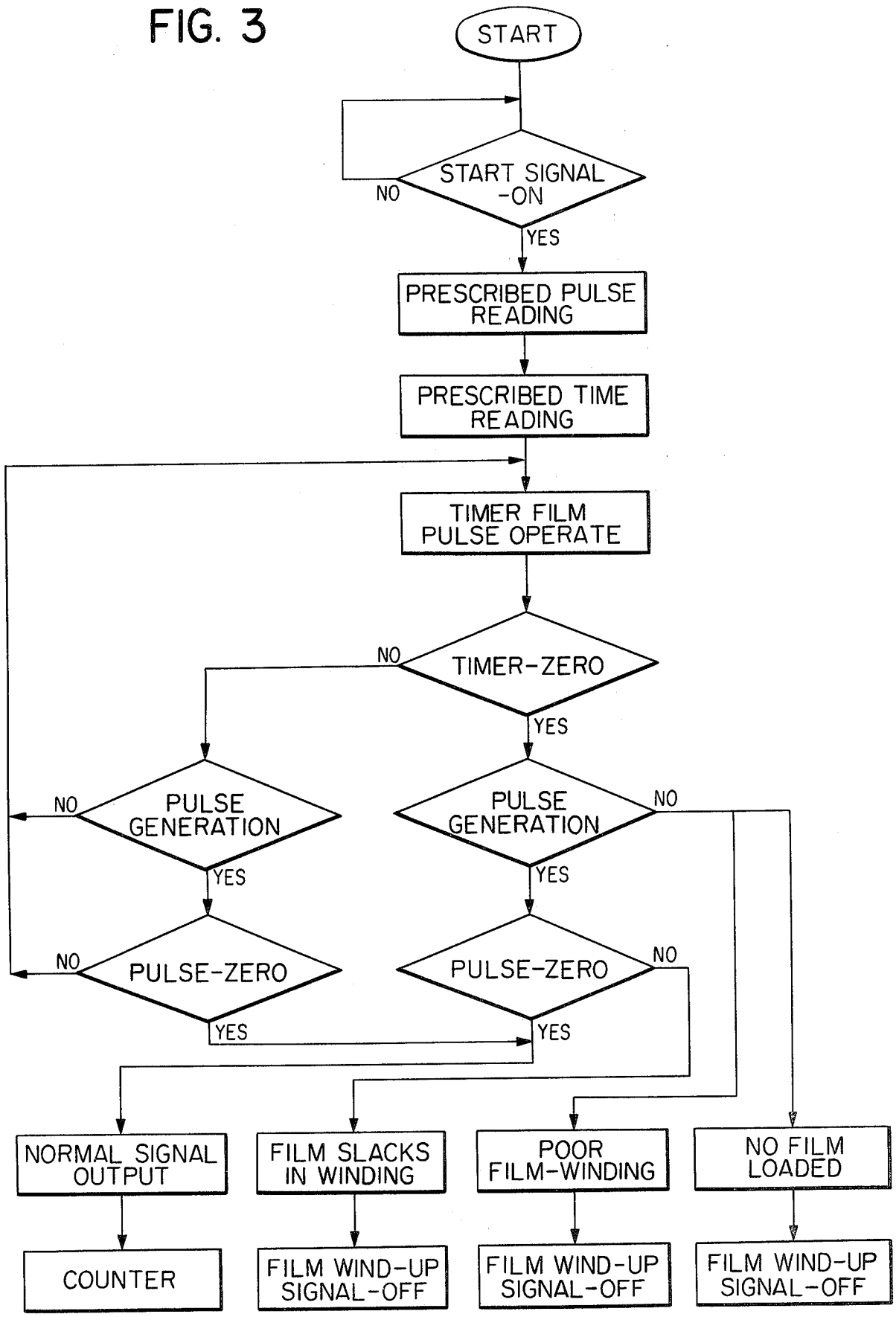

FILM WINDING DEVICE

BACKGROUND OF THE INVENTION

1. Field of the Invention

The present invention relates to a film winding device, wherein any improper film winding can be detected by comparing the actual amount of film taken-up with the prescribed of a film wound-up, in a camera in which the amount of film wound-up can directly be measured.

2. Direction of the Prior Art

Heretofore, the film wind-up operation has been performed in the manner that a sprocket coupled for rotation with the perforations of a film roll is mechanically linked in motion to a film take-up spool, and when said sprocket is rotated for a given time, the rotation thereof is stopped by a cam mechanism, and thus the film take-up operation is halted. Accordingly, in the case that a film roll is not taken up due to the wrong film loading, or that the taking-up of a film roll is not properly performed due to the slack winding of the film roll, there have been many instances where a similar indication is displayed as that when the film wind-up operation is regularly performed by the rotation of a sprocket. However, such a wrong operation is seldom noticed by a photographer and has not been noticed in most cases until the film was developed.

SUMMARY OF THE INVENTION

The present invention is to detect and indicate the aforesaid improper film winding. It is an object of the invention to provide a film winding device comprising means for detecting the actual taken-up amount of film and a control circiut which stops the film wind-up operation when the actual taken-up amount of film does not amount to the prescribed amount of film within a prescribed period of time. Other and further objects, features and advantages of the invention will appear more fully from the following description. Now, the invention is explained detailedly referring to the accompanying drawings.

BRIEF DESCRIPTION OF THE DRAWINGS

FIG. 2 is a block diagram of the control circuit thereof and FIG. 3 is a flow chart demonstrating operation of the structure and circuitry illustrated in FIGS. 1 and 2.

DESCRIPTION OF THE PREFERRED EMBODIMENT

Figure 1:
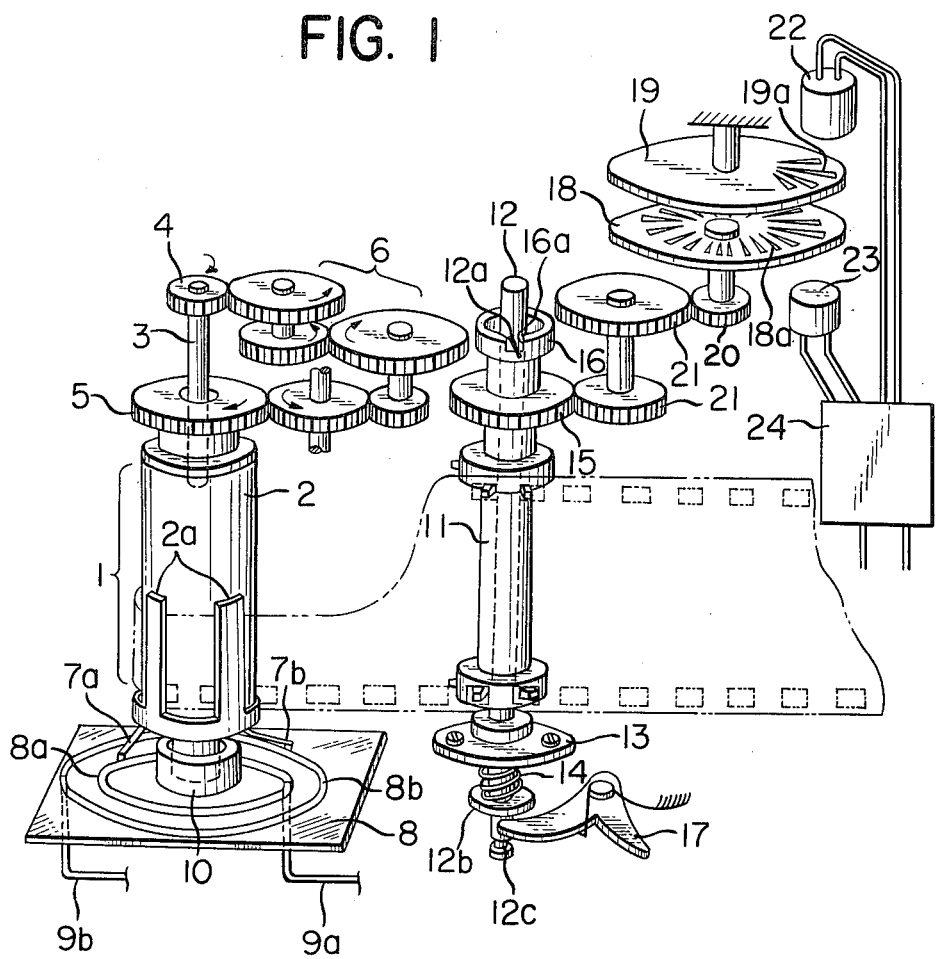
FIG. 1 is a perspective view showing a portion of the structure concerned of a motorized film wind-up type camera having a constitution particularly suitable for embodying the invention.

In FIG. 1, numeral 1 is a film taking-up motor whose outside frame serves as a reel 2 for taking up a film roll; 2a is a plastic extension for pressing against the front end of a film roll, provided in the body of reel 2; 3 is a motor shaft; 4 is a shaft gear mounted on motor shaft 3; 5 is a reel gear unitary with reel 2; 6 is a gear train transmitting with deceleration the revolution of shaft gear 4 to reel gear 5; 7a and 7b are the current collecting brushes of motor 1, respectively rotating with reel 2; 8 is a printed circuit plate; 8a and 8b are the ring shaped terminals on printed circuit plate 8 for current collecting brushes 7a and 7b; 9a and 9b are lead wires; and 10 is a bearing for reel 2, mounted on printed circuit plate 8. When the circuit for driving the film take-up motor receives a signal for driving the motor and electric power is supplied from a electric power source (not shown) to film take-up motor 1 through lead wires 9a and 9b, ring shaped terminals 8a and 8b and current collecting brushes 7a and 7b, motor shaft 3 starts to rotate in the direction of the arrow; its rotation is reduced by gear train 6 and the reduced rotation is then transmitted to reel type gear 5 to rotate the same in the direction of the arrow and thus reel 2 takes up the film roll.

Numeral 11 is a sprocket which engages with perforations of a film roll and rotates in accordance with the film take-up amount; 12 is a sprocket shaft which rotates with sprocket 11 and is slidable in the axial direction thereof. Numeral 13 is a bearing; 14 is a spring which is fitted in between flange 12b of sprocket shaft and bearing 13; and urges sprocket shaft 12 downwardly; 15 is a gear for driving a slitted disc, which is mounted in sprocket shaft 12 so as to be rotatable therewith through a connecting ring 16 having connecting groove 16a attached to gear 15 and a connecting pin 12a on the upper part of sprocket shaft 12 engages said connecting groove 16a. Therefore, slitted disc driving gear 15 can rotate with sprocket 11, but on the other hand the engagement of connecting groove 16a with connecting pin 12a can be disengaged by thrusting upwardly the lower end of sprocket shaft 12 against the resistance to spring 14; this arrangement of elements is maintained because the front end of releasing lever 17 falls into releasing groove 12c at the lower end of sprocket shaft 12. Numeral 18 is the rotary slitted disc provided with a number of radial slits at equal pitches, and 19 is a fixed slitted disc which is positioned so as to face rotary slitted disc 18 and has slits 19a opposite slits 18a of the rotary slitted disc. Numeral 20 is a slitted disc gear for rotating slitted disc 18 on the same axle; it is coupled with slitted disc driving gear 15 through gear train 21. Numeral 22 is a light emitting element and 23 is a photoelectric transducer receiving the light from the light emitting element having passed through both slits 19a of fixed slitted disc 19 and slits 18a of rotary slitted disc 18 to provide an electric signal, and 24 is an amplifier.

In film wind-up mechanisms of this type, there is no mechanical connection between the rotation of film taking-up reel 2 and the rotation of sprocket 11, and sprocket 11 is rotated by only its coupling to the perforations of the film roll; this rotation is transmitted to rotate slitted disc driving gear 15 through connecting pin 12a and connecting groove 16a of sprocket shaft 12, and further to rotate rotary slitted disc 18 through gear train 21. The rotation of the latter makes the light from the light emitting element intermittent after having passed through slits 19a of fixed slitted disc 19, and consequently a pulse signal is generated from the amplifier 24. The number of said pulse signals will be accurately proportionate to the amount of rotation of sprocket 11 by the perforations carried by the film take up, and no pulse signal is generated by an idle winding up when no film roll is loaded, or by winding up when no perforation is engaged with sprocket 11.

Figure 2:
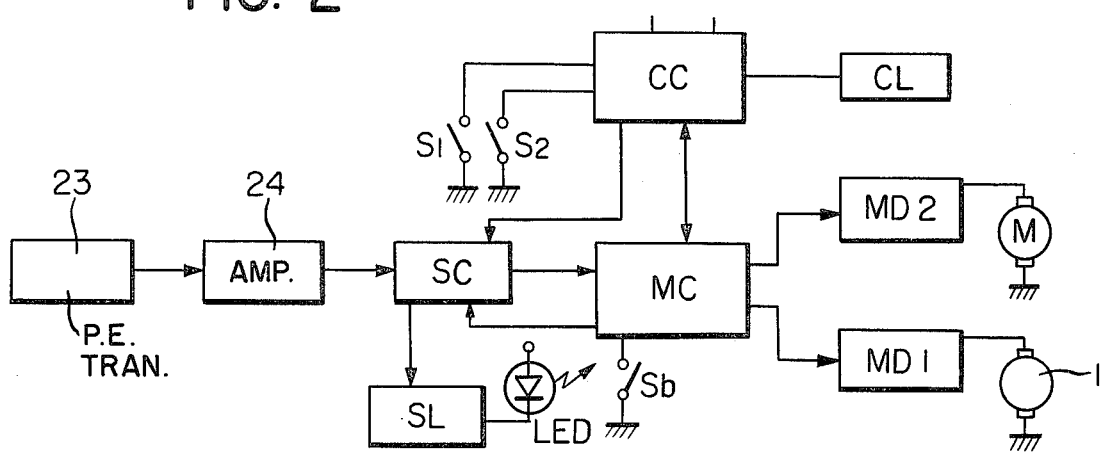

FIG. 2 is a block diagram showing a control circuit for the film wind-up operation, wherein numerals 23 and 24 are a photoelectric transducer and an amplifier respectively similar to those shown in FIG. 1, and SC is a film transport detection counter which receives the pulse signals from the amplifier 24, counts the pulse signals and gives the counting operation signals to display circuit SL for confirming film transport, and at the same time compares the counted pulse number with the prescribed pulse number which corresponds to a prescribed film transport momentum, and then gives a signal to motor control circuit MC at the time when both pulse numbers compared agree with each other.

Display circuit SL for confirming a film transport may use light emitting diode LED for displaying a transport emission and shows that a film is being transported, during the period of receiving counting operation signals generated from film transport detection counter SC.

Motor control circuit MC will give a motor driving signal to film take-up motor driving circuit MDI when it receives a motor starting signal given from central control circuit CC, or when back-lid switch Sb is switched over from ON to OFF by closing the back-lid of a camera, and will also give a motor stopping signal to film take-up motor driving circuit MDI when it receives a counting-up signal from film transport detection counter SC. At such a time, in the case that motor control circuit MC has received a motor starting signal given from central control circuit CC, the information thus received is given into film transport detection counter SC, and SC compares the counted pulse number with the prescribed pulse number corresponding to the amount for transporting one frame of film and thus counting-up signal is given to motor control circuit MC, and in the case that back-lid switch Sb was switched over from ON to OFF, the information thus received is given into film transport detection counter SC similarly to the former case, and SC compares the counted pulse number with the prescribed pulse number corresponding to the momentum for taking up a film roll at the time when a film roll was wound round, and thus counting-up signal is given to motor control circuit MC.

Film taking-up motor driving circuit MD1 connects film taking-up motor 1 to the electric power source when a motor driving signal was received, and the said connection is disconnected when a motor stopping signal was received. Therefore, in the case that the back-lid of a camera was closed so that a film roll can be wound round reel 2 as shown in FIG. 1, film take-up motor 1 will stop when the film roll was taken up by reel 2 as much as a film roll is taken up when it was wound round, and in the case of taking a photograph thereafter, said film take-up motor will stop when a film roll was shifted by a single frame thereof. In stopping film taking-up motor 1, a resetting signal is given from motor control circuit MC or central control circuit CC to film transport detection counter SC, and thereby the counted pulse number is cleared out.

When release switch S2 is switched on, central control circuit CC may memorize and maintain a variety of photographing conditions through a control circuit (not shown), and drive both a mirror and a diaphragm, and then make a shutter release. After the rear curtain of a shutter was released completely, a motor starting signal is given to motor control circuit MC and the film take-up is operated; however in order to balance the load, prior to the film take-up operation, charging motor driving circuit MD2 is first generated, and the mirror, shutter, etc. are actuated and then a motor driving signal is given to film taking-up motor driving circuit MD1. When the film take up is completed, a signal is given from motor control circuit MC to central control circuit CC, and thus all the circuits are reset to restore the initial state for the next photographing.

In the film wind-up means as mentioned above, the manner of detecting and displaying a wrong operation is now explained by reference to the flow-chart shown in FIG. 3.

As already explained, the film winding up is started when switch Sb was switched on by closing the back-lid of a camera or when the rear curtain of a shutter was completely released. Thus, when the aforesaid film wind-up signal is ON, central control circuit CC reads the prescribed pulse number in a transient memory. The said prescribed pulse number will correspond to the amount for winding up one frame of film if the rear curtain of a shutter is released, and would be the pulse number corresponding to the amount for taking up a film roll which was wound round, that is, normally the pulse number corresponding to those for winding up three frames of film. Next, said central control circuit CC reads a prescribed period of time, that is, a period of time having been prescribed in advance necessary for winding up a film roll under ordinary conditions plus some allowances. Motor driving circuit MD1 is operated by a signal given from motor control circuit MC and film wind-up motor 1 starts to operate and then film transport detection counter SC starts to count the pulses generated from the amplifier 24; at the same time, the clock-pulses generated from clock-pulse generator CL shown in FIG. 2 starts to count.

During the period before said clock-pulses reach the prescribed number, that is, in the case that the prescribed period of time does not elapse, "Timer-Zero" is in the state of NO. In the case that "Pulse Generation" is YES and "Pulse-Zero" is YES, the difference between the pulse number counted by counter SC within a prescribed period of time, and the prescribed pulse number for winding up a film roll within the same peiod of time is zero, that is, it indicates that film winding was completed, and thus a stop signal for film winding and a normal signal are generated at the same time. Except the abovementioned cases, the counting operations for both clock-pulses and film taking-up pulses are kept on as they are during "Timer-Zero" is NO. In the state that "Timer-Zero" is YES, that is, even after the prescribed period of time has elapsed, and if "Pulse Generation" is NO, that is, if film transport pulses are not counted by counter SC, the state is judged "Poor Film-Winding" and a stop signal is given from central control circuit CC to motor control circuit MC and thus film take-up motor driving circuit MD1 stops the film take-up motor 1. Simultaneously therewith, a signal advising a wrong operation is given from central control circuit CC to film transport counter SC and is then on display element LED through display circuit SL for confirming a film transport.

The state of a poor film-winding as described above may be displayed by means of, for example, display element LED which is turned on and off in a different cycle, or by jointly using the other means such as buzzer.

Generation of film transport pulses may be made by utilizing a variety of methods such as ones in which a conductive part and insulated parts alternately come into contact with a contact point, or by ones in which a pulse motor is utilized, besides the one of the example given herein. If circumstances require, they may be made by measuring the diameter of a film roll loaded on the reel.

Also in the case of an operation without any loaded film roll, that is, the case of attempting to photograph without any film, as described in the example, if charging motor M is energized before film wind-up motor 1 is to be energized, it is possible to operate as before and there is not any inconvenience at all.

What is claimed is:

1. In a device for winding film in response to a winding signal and including means operable for causing winding movement of the film upon receipt of the winding signal, means for detecting movement of the film and for generating an output of pulses quantitatively in accordance with the amount of film movement, a predetermined number of said pulses corresponding to one frame of film movement, control circuit means for receiving the winding signal and said pulse output and for operating the winding means to cause film movement until said predetermined number of pulses has been received, and timer means connected to the control circuit means and actuated upon receipt of the winding signal for a time interval longer than that normally required to wind the film an amount corresponding to one frame, said control circuit means further monitoring said timer means and discontinuing operation of the winding means upon expiration of said timer means interval when said predetermined number of pulses have not yet been received.

2. In a device in accordance with claim 1, said detecting and generating means comprising at least a disc having a plurality of slits defined therein and rotated in conjunction with winding movement of the film, and photoelectric means disposed in conjunction with said disc for detecting the plural slits in the disc and for generating said pulses as the disc rotates.

3. In a device in accordance with claim 1, said detecting and generating means comprising a pulse generator.

4. In a device in accordance with claim 1, said winding signal comprising a shutter release actuation in a motor driven camera.

* * * * *